Patented July 18, 1950

2,515,409

UNITED STATES PATENT OFFICE 2,515,409

PROCESS OF TREATING RICE PADDY FOR MILLING

Watkins W. Jones and George W. Brewer, Sacramento, Calif., assignors to Rice Growers Association of California, Sacramento, Calif., a corporation of California No Drawing. Application April 16, 1945, Serial No. 588,726

3 Claims. (Cl. 99—80)

This invention relates to a rice paddy treating process and has for one of its main objects a process of treating the rice paddy prior to milling so that the breakage in the milling process will be reduced. Another object is a process that will result in rice that is substantially free from infestation and which rice has most of the food values heretofore lost in milling. A still further object is a process for improving the flavor or taste of rice.

Briefly, the present process is one that includes the steps of soaking and parboiling the rice in steam. These steps, broadly speaking, are not new. Most prior attempts have been directed toward shortening the processing time either by using relatively high pressures during the soaking step or by using soaking water at a temperature of over 200° F. or near boiling. A long soaking period running into a matter of hours is not practical nor desirable and if the paddy is subjected to water near the boiling temperature its structure is impaired and the breakage in milling is too high to warrant the expense of the process.

By our process the rice paddy may be soaked, parboiled and dried to the proper dryness for milling within about three hours time. A comparison between about 100 lbs. of rice paddy processed in the conventional manner and 100 lbs. of rice paddy processed in accordance with the preferred form of this invention is as follows:

|  | Conventional Process | This Invention |
|---|---|---|
|  | Pounds | Pounds |
| Whole rice | 50 | 70 |
| Broken rice | 18 | 5 |
| Bran, Polish, seed | 12 | 5 |
| Hulls | 20 | 20 |

The vitamins in the bran and polish are not lost by the present process, and the 5 lbs. listed above under the heading of "bran, polish, seed" represents mostly seed. The above figures are approximate, inasmuch as the loss by breakage where our process is used is closer to only about 4.5%, by weight.

In appearance where rice paddy is soaked and parboiled prior to milling there should be a substantial absence of what is termed "white bellies" in the milled rice. Such rice is not only displeasing in appearance, but it lacks the necessary hardness to successfully resist breakage in milling and is susceptible to infection when stored. Where the rice is not soaked to the point where it is substantially saturated they will have these undesirable characteristics, and if the rice is soaked too long in relatively low temperature water there is a loss in food values.

By our invention, as hereafter described, the grains, after milling, are substantially free from white bellies or spots and are almost translucent, as distinguished from the chalky appearance of ordinary milled paddy. The figures above noted indicate its freedom from breakage, as well as the fact that the food values are retained. Also such rice is practically free from objectionable infestation that is prevalent with ordinary milled rice. When cooked, rice that has been processed by this invention has a distinctive and pleasing flavor that ordinary rice does not have, and the grains are white and free from objectionable pastry or sticky characteristics.

In detail, the paddy rice as received at the processing plant from the growers contains foreign material such as chaff, straw, water grass seed, etc. This foreign material is removed in the usual way by screens, and ordinarily the rice paddy containing about 15% moisture by weight would be milled as soon as the foreign material is removed.

The cleaned paddy is next placed in trays having side walls and that have perforated bottom walls, and the depth of the layer of paddy in each tray is from about 3 inches to about 6 inches. Four inches is preferable. The trays are then arranged in stacks with a cover on the top tray of the stack. The space between each layer and the bottom of the tray thereabove is sufficient to permit the water to freely circulate through the layer when the trays are immersed in water. The thickness of each layer of paddy is relatively important both in the soaking step and in the parboiling step inasmuch as the water and steam must almost instantly reach all of the paddy as soon as the trays are immersed in water or placed in the steam chamber, and this result is preferably accomplished without unnecessary agitation of the paddy. Agitation of the paddy as would occur in boiling has a tendency to cause the hulls to open, with the result that the grain is distorted or discolored or both.

The stack of trays is then placed in water in a tank so that the water will quickly reach all of the paddy. The temperature of the water is preferably at about 180° F. and it is maintained at said temperature or in the neighborhood of 180° F.

If the temperature of the water is too hot or substantially above 180° F. the time for soaking to the desired degree would be shortened, but the physical characteristics of the paddy would be impaired, such as opening of the hulls or distortion of the grains or both. A temperature above 200° F. is practically certain to result in one or both of their undesirable occurrences. If the temperature of the water is too cool, or substantially below 180° F., the time for soaking to the point where the paddy has absorbed the desired amount of water would be longer, and as soon as the paddy has been in the water longer than about thirty minutes the food values commence to pass into the water and are lost. Even leaving the paddy in the water at 180° F. after the water has permeated through the cell structure and the paddy is substantially saturated results in injury to the grain and in loss of food values.

In accordance with our invention the rice paddy remains in the water of about 180° F. for about thirty minutes and it is then removed. At this point the paddy is substantially saturated; that is, the water has permeated throughout the cells in the grain and little if any more water would be absorbed by the paddy if left longer.

The excess water quickly drains from the paddy as soon as the trays are removed from the soak water, and the trays are then quickly placed in a steam chamber or autoclave before any substantial amount of heat is lost.

After the trays are in the autoclave, steam is admitted at a controlled rate of speed so that the pressure will rise to about twenty-five pounds per square inch at the end of about three minutes time from the time of admittance. This is an important feature. The temperature of the steam at twenty-five pounds pressure is about 267° F., and this pressure is maintained for about fifteen minutes, after which the steam is exhausted from the autoclave at a controlled rate so that about three minutes will be required to reduce the pressure to atmospheric pressure, the steam being turned off at the commencement of the discharging step. This slow release is also important.

As soon as the pressure in the autoclave is reduced as above described, the trays are removed and the rice paddy is immediately transferred to the drier so that the drying step may be started before a substantial amount of the heat in the paddy is lost. If the paddy cools too much the hulls open and the paddy tends to stick together.

A conventional "Berico Rice Drier" may be used for drying, which drier comprises a tower provided with spaced, perforated vertical walls defining the walls of a central, vertical, hot air shaft or flue. The paddy is positioned between the spaced walls, and a closure at the top of the tower causes the heated air that is moved upwardly through the central flue by a fan to move laterally through the mass of paddy between the said walls, thus drying said paddy.

Temperature considerations are very important in this drying step irrespective of the type of apparatus that may be used. Other apparatus may, of course, be used instead of the above drier.

We have found that the temperature of the air in the drier at the start should be preferably about 150° F. and this temperature should be maintained until the moisture content of the rice is reduced to about 22½% by weight. At about 150° F., it will require about one and one-half hours to reach this point. Then the temperature should be reduced to about 100° F. and maintained at this temperature until the moisture content of the rice is about 15½% by weight. In about one and one-half hours time at 100° F. this point will be reached. Finally, all artificial heat is discontinued, and air at atmospheric temperature should be forced over and through the rice in the drier until the moisture content of about 15% by weight is reached. This will take about one and one-fourth hours time and this latter step is principally a cooling step rather than a drying step.

The relatively high starting temperature is not as critical as the later temperatures, and a high starting temperature of about 200° F., while not as desirable as 150° F. will not do particular injury to the rice, but if such higher temperature were used too long the end product would not withstand the milling process without objectionable breakage, and the same detrimental result would occur were the 150° F. temperature maintained too long.

An example of the use of higher temperatures is as follows. At about thirty minute intervals the temperature is dropped from about 200° F. to 80° F., and after being maintained at 80° F. for thirty minutes it is removed. The total drying time in this instance would be about two and one-half hours as compared with three hours as in the first example. However, in the second example about 7.3% of the rice was broken in milling, while by the first example only 4.5% of the head rice was broken. When it is considered that the breakage in rice by methods where no parboiling and steaming is practiced is about 18% by weight, it is apparent that even the second example is a great improvement over conventional methods.

It may be said that three main end results are desired, which results, in the order of their importance are (1) higher yield of head rice (less breakage in milling), (2) pleasing appearance (absence of white bellies in hulled grain), (3) maximum food values (retention of vitamins in bran and polish).

After the rice is dried in the drier it may be stored for milling, and should not be milled for from one to two days after the drying step, preferably several days. If milled immediately after drying the rice is somewhat rubbery and the desired end results are not obtained. The rice tends to stick, and the milling machinery is gummed up.

Insofar as the drying step is concerned, it appears that in order to obtain the desired results, the relationship between temperature and moisture content is quite important. Where the moisture content is high, as at the start, a temperature of about 200° F. may be used without injury, but when the moisture content is about 22½% by weight, this temperature must be dropped, and as the moisture content is further reduced, there must be corresponding reductions in the air temperature. The final period where the moisture content approaches 15% is quite critical and the temperature should preferably be atmospheric temperature.

By this process as described, the finished rice has a pleasing transluscent appearance substantially free from the objectionable white spots, known as "white bellies." The translucent grains are very hard and are of a sort of light amber cast until cooked, when they become substantially white. The rice is practically vermin resistant, which is not true of conventionally processed rice, and the flavor is greatly improved,

We claim:

1. A process of treating rice paddy for milling that comprises the steps of soaking the paddy in hot water of about 180° F. until the paddy is substantially saturated, then removing the paddy from said water and subjecting it to steam under about twenty-five pounds pressure for about fifteen minutes then gradually reducing the steam pressure to atmospheric pressure then causing air at a temperature of about 150° F. to pass through the mass of paddy until the moisture content of said paddy is between about 20% and about 25% by weight and then reducing the temperature of said air to about 100° F. and maintaining the temperature of said air at about 100° F. until the moisture content of the paddy is about 15% by weight, and then causing air of atmospheric temperature only to pass through the paddy for about an hour.

2. A process of treating rice paddy for milling that comprises the steps of soaking the paddy in hot water of about 180° F. until the paddy is substantially saturated, then removing the paddy from said water and subjecting it to steam under about twenty-five pounds pressure for about fifteen minutes then gradually reducing the steam pressure to atmosphere pressure then causing air at a temperature of about 150° F. to pass through the mass of paddy until the moisture content of said paddy is between about 20% and about 25% by weight and then reducing the temperature of said air to about 100° F. and maintaining the temperature of said air at about 100° F. until the moisture content of the paddy is about 15% by weight, and finally storing said rice paddy for at least from about one to two days before milling the same.

3. A process of treating rice paddy for milling that comprises the steps of soaking the paddy in hot water of about 180° F. until the paddy is substantially saturated, then removing the paddy from said water and subjecting it to steam under about twenty-five pounds pressure for about fifteen minutes, then causing air to pass through the mass of paddy at about 150° F. until the moisture content of the paddy is about 22% by weight, and then gradually reducing the air temperature to about 100° F. until the moisture content of the paddy is about 15% by weight.

WATKINS W. JONES.
GEORGE W. BREWER.

REFERENCES CITED

The following references are of record in the file of this patent:

UNITED STATES PATENTS

| Number | Name | Date |
| --- | --- | --- |
| 992,295 | Tiemann | May 16, 1911 |
| 1,925,267 | McKay | Sept. 15, 1933 |
| 2,334,665 | Yonan-Malek | Nov. 16, 1943 |
| 2,334,666 | Yonan-Malek | Nov. 16, 1943 |

OTHER REFERENCES

Fan Engineering, 2nd, pub. by Buffalo Forge Co., Buffalo, N. Y., p. 221.